(No Model.) 4 Sheets—Sheet 1.
W. F. BANKS.
ELECTRICAL INDICATING SYSTEM FOR ANNUNCIATORS.
No. 546,874. Patented Sept. 24, 1895.
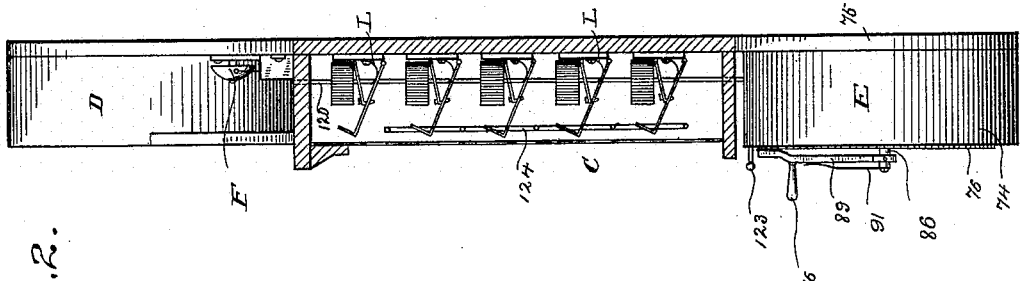
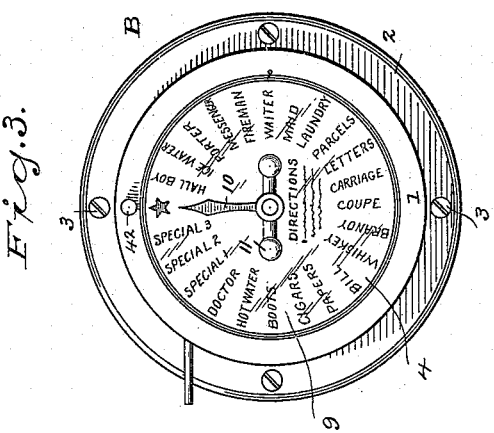
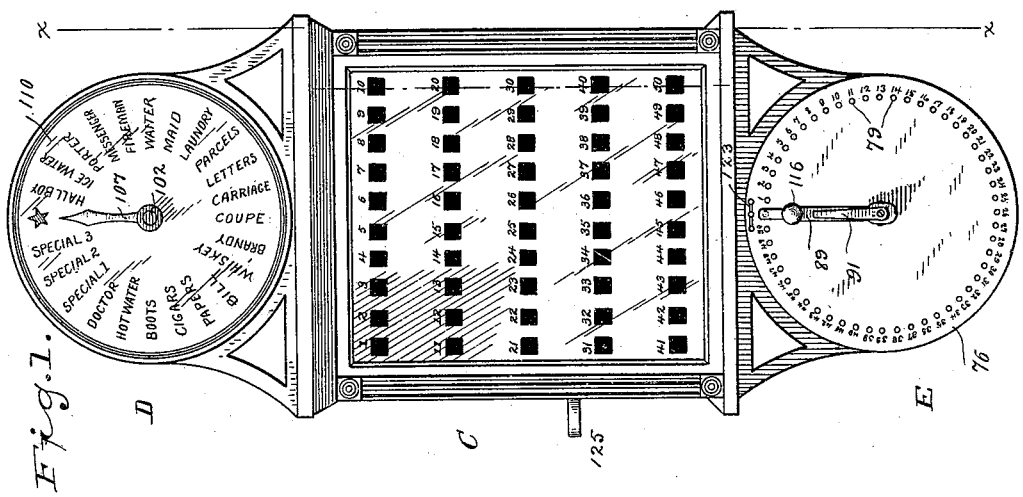
WITNESSES
H. A. Lamb
Pearl Reynolds.
INVENTOR
Walter F. Banks
By
A. M. Wooster
Atty.

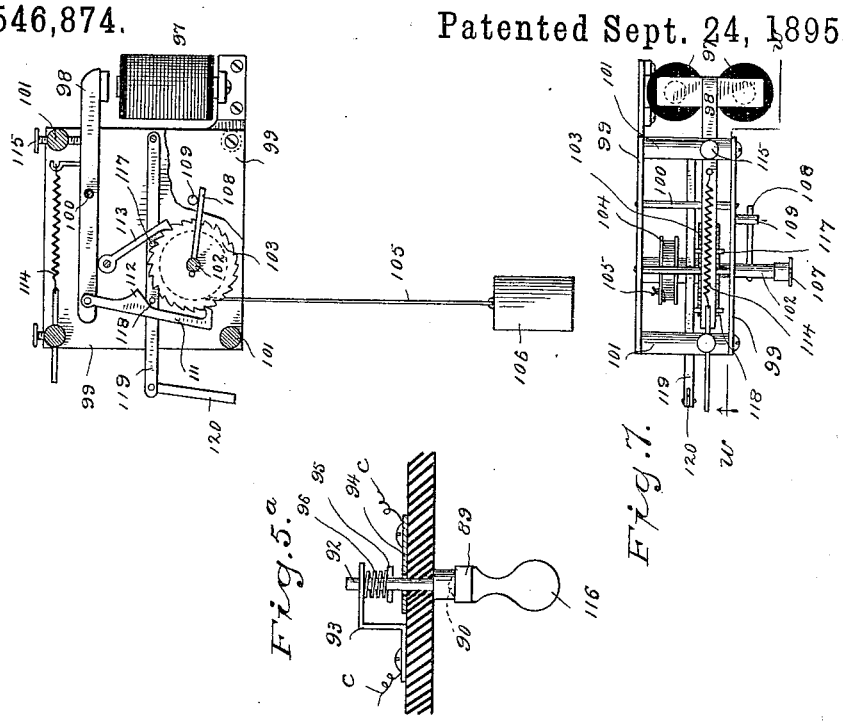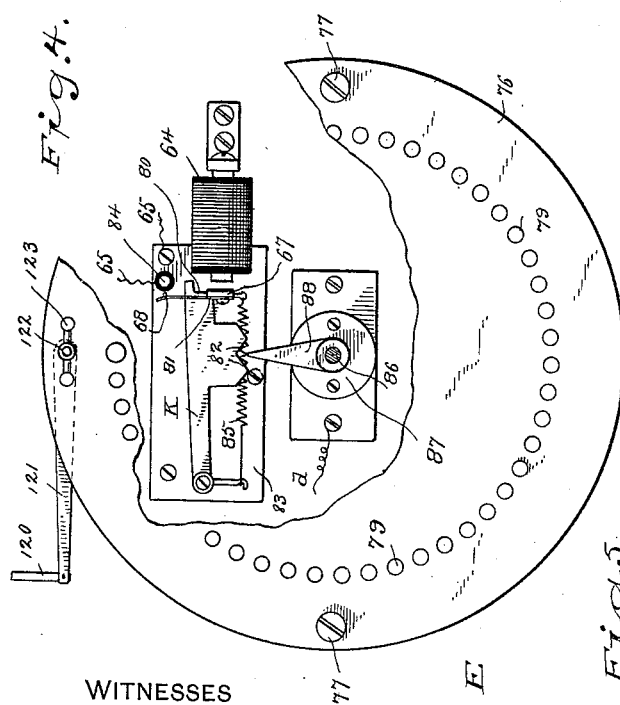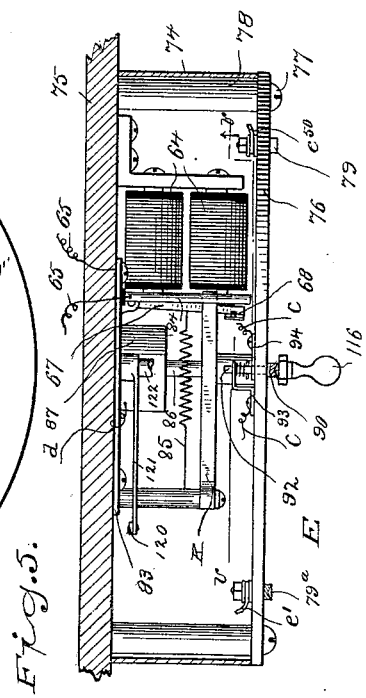

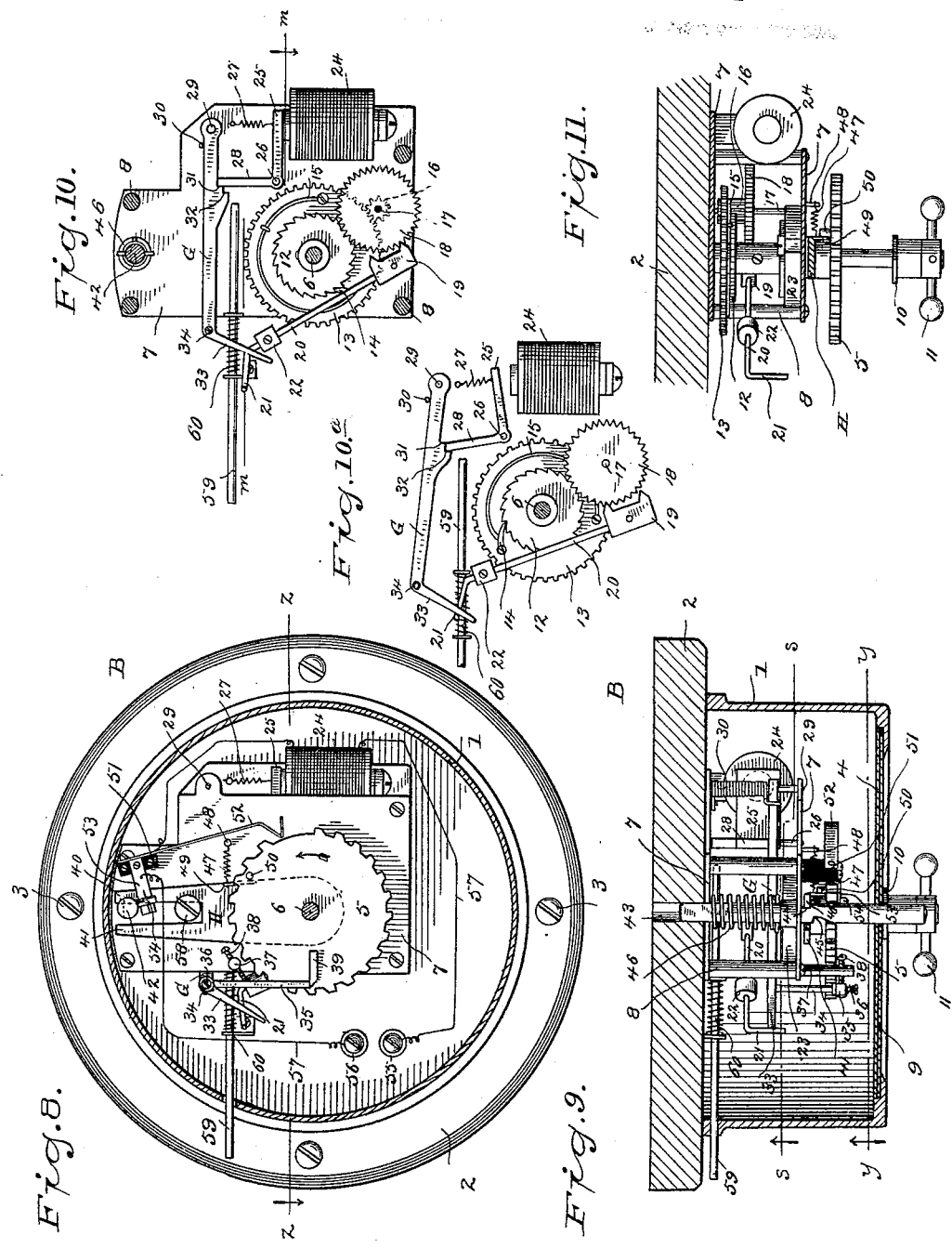

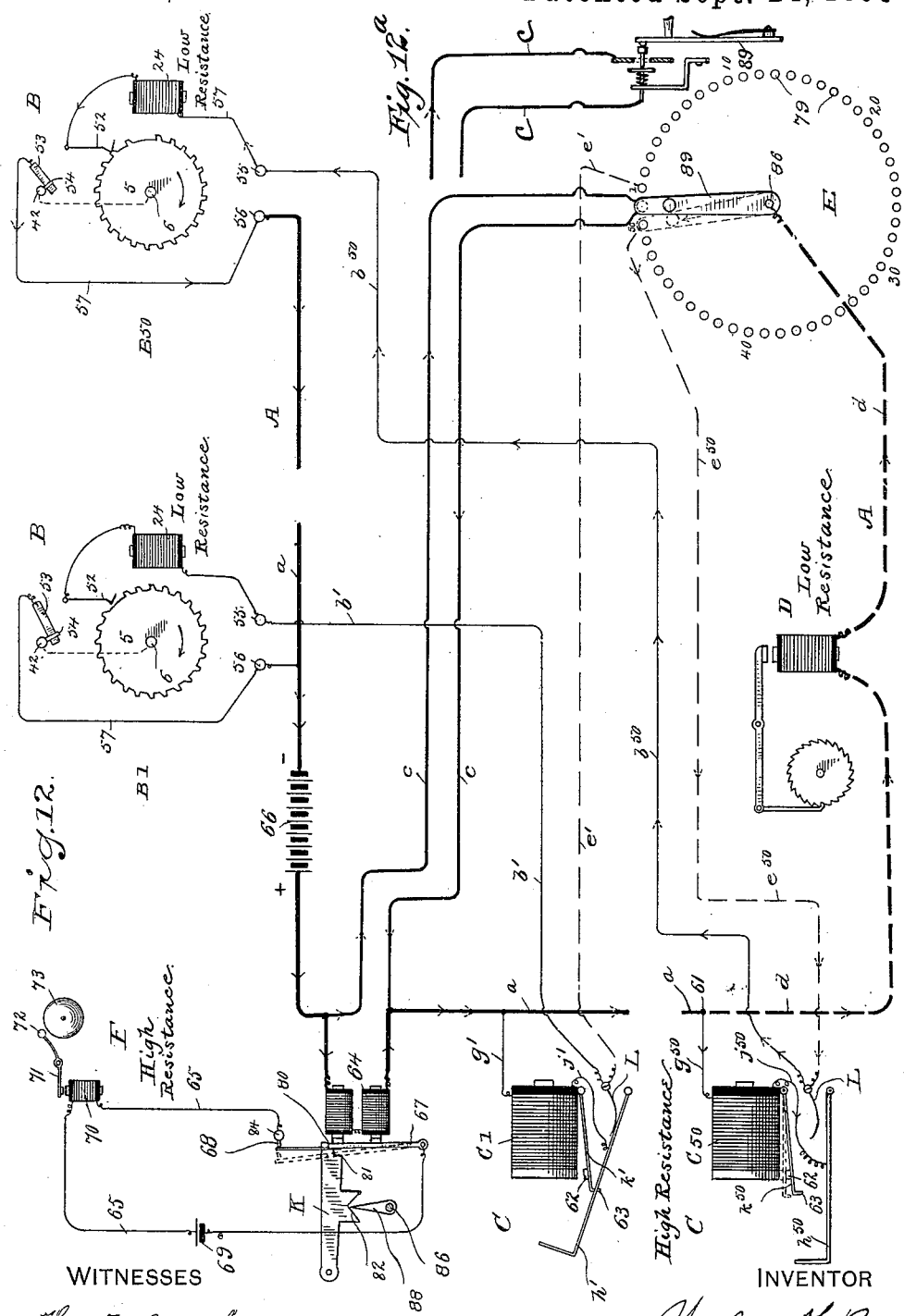

UNITED STATES PATENT OFFICE.

WALTER F. BANKS, OF MILFORD, CONNECTICUT.

ELECTRICAL INDICATING SYSTEM FOR ANNUNCIATORS.

SPECIFICATION forming part of Letters Patent No. 546,874, dated September 24, 1895.

Application filed October 2, 1893. Serial No. 486,968. (No model.)

*To all whom it may concern:*

Be it known that I, WALTER F. BANKS, a citizen of the United States, residing at Milford, in the county of New Haven and State of Connecticut, have invented certain new and useful Improvements in Electrical Indicating Systems for Annunciators; and I do hereby declare the following to be a full, clear, and exact description of the invention, such as will enable others skilled in the art to which it appertains to make and use the same.

My invention has for its object to devise an indicating system and to provide suitable apparatus which may be used in connection with any of the ordinary electrical annunciators now upon the market or may be applied in connection with annunciators already in use, which shall have every advantage of the most expensive messenger systems now in use—such, for instance, as the indication at a hotel office of the exact service required at any room in the hotel and a return-signal to the room that the call is noted—the mechanism of my novel system being simple, durable, and practically impossible to get out of repair, inexpensive to put up and inexpensive in use, owing to the fact that there is practically no waste of electricity, the main circuit being closed but an instant to operate the annunciator when a call is announced, and again closed an instant at a time when the call is noted to actuate the indicator to receive the call, the bell being operated by a local battery.

With these ends in view I have devised the novel system and apparatus which I will now describe, referring by letters and numerals to the accompanying drawings, forming part of this specification, in which—

Figure 1 is a front elevation of the office apparatus, including the annunciator, the indicator, and the controlling-switch; Fig. 2, a section on the line $xx$ in Fig. 1; Fig. 3, a front elevation of one of the call-boxes; Fig. 4, an elevation, on an enlarged scale, of the controlling-switch, the dial being broken away to show the mechanism, and the shaft being in section on the line $v\,v$ in Fig. 5; Fig. 5, a plan view corresponding with Fig. 4, the back of the case being in horizontal section; Fig. 5ª, an enlarged detail view corresponding with Fig. 5; Fig. 6, an elevation of the indicator mechanism, the standards being in section on the line $w\,w$ in Fig. 7; Fig. 7, a plan view corresponding with Fig. 6; Fig. 8, a front elevation, on an enlarged scale, of the mechanism within the call-box, the case being in section on the line $y\,y$ in Fig. 9; Fig. 9, a section on the line $z\,z$ in Fig. 8; Fig. 10, a section on the line $s\,s$ in Fig. 9; Fig. 10ª, a detail view corresponding with Fig. 10, showing the reverse position of the parts; Fig. 11, a section on the line $m\,m$ in Fig. 10. Fig. 12 is a diagrammatic view illustrating the several elements of the system and the electrical connections, and Fig. 12ª is a detail view corresponding with Fig. 12.

My novel system includes five essential elements, to which is preferably added an alarm making a sixth element. These elements are as follows: an electrical circuit, (designated by A,) a call-box in each room in the system, (designated by B,) an annunciator of any ordinary simple construction, (designated by C,) an indicator, (designated by D,) a controlling-switch, (designated by E,) and an alarm, in the present instance a bell, (designated by F.) By the term "call-box" I mean a mechanism located in each room for sending in calls from that special room. By the term "annunciator" I mean a mechanism located at the office for announcing the special room from which a call is to be sent, the fact that a call has been announced being preferably indicated by a suitable alarm. By the term "indicator" I mean a mechanism located at the office for indicating the special call sent in, and by the term "controlling-switch" I mean a mechanism located at the office for controlling the indication at the office and for indicating at the room that the call is noted.

Turning now to Figs. 8, 9, 10, and 11, in connection with Fig. 3, I will describe element B of the system. 1 denotes the case, which is of ordinary construction, usually a metallic box attached to a block 2, the latter being adapted for attachment to the wall of a room in any suitable manner, as by screws 3. At the front of the box is a dial 4 on which are printed the several calls the box is intended to make, the special number of calls not being of the essence of my invention; also directions for operating the box. In the present instance I have indicated twenty specific calls and three special calls, it being contemplated that any occupant of a room who may desire to make special calls can leave explanations at the office, so that if special 1, 2, or 3 is called the clerk will know how to answer the call. 5 denotes the break-wheel, which is carried by a shaft 6, journaled in plates 7 within the case, the outer plate being secured to standards 8, extending from the inner plate, the break-wheel being shown as outside the outer plate, but within the dial. The break-wheel in the present instance is shown as provided with twenty-three teeth, corresponding to the twenty-three calls, which the box is capable of making, and with one vacant space. 9 denotes a glass over the dial, 10 a pointer on shaft 6, which I have shown as outside of the glass, but which may of course be placed between the glass and the dial, if preferred, and 11 is a finger-piece at the outer end of the shaft for convenience in turning the pointer and break-wheel in making a call, as will be more fully explained. 12 denotes a ratchet on shaft 6, the number of whose teeth is just one in excess of the number of teeth on the break-wheel, in the present instance there being twenty-three teeth on the break-wheel. Twenty-four teeth are required upon this ratchet, the additional tooth on the ratchet corresponding with the normal point on the dial, in the present instance indicated by a star, and with the vacant space on the break-wheel. Back of ratchet 12 is a gear-wheel 13, which turns freely on the shaft. 14 denotes a pawl carried by the gear-wheel and engaging the ratchet, said pawl being held in engaging position by a spring 15, also carried by the gear-wheel. Gear-wheel 13 meshes with a pinion 16 on a shaft 17, which also carries a scape-wheel 18. 19 denotes a pallet engaging the scape-wheel and provided with an outwardly-extending arm 20, the end of which is suitably shaped to form a locking-hook 21. 22 denotes a weight on arm 20, which may be adjusted as required. 23 denotes the main spring, one end of which is attached to shaft 6, the other end being attached to one of the plates 7, in the present instance the front plate. It will be seen from Fig. 10 that when the shaft and ratchet are turned toward the right the gear-wheel will remain stationary, pawl 14 slipping over the teeth of the ratchet. This will wind the spring, so that when released in the manner I shall presently describe it will return the shaft and ratchet to their normal position, said parts carrying the gear-wheel around with them toward the left, the relative number of teeth on pinion 16 and gear-wheel 13 being wholly unimportant so far as my present invention is concerned. 24 denotes an electromagnet of "relatively-low" resistance, and 25 an armature pivoted at 26. 27 is a spring, one end of which is connected to the armature and the other end to one of the plates 7, the action of said spring being to lift the armature away from the pole of the electromagnet, as illustrated in Fig. 10ª. 28 is an angle-arm extending from armature 25, which serves as a means for locking the armature out of operative position, as in Fig. 10ª, and also as a means for disengaging it from said position under certain circumstances, as I shall presently explain. G denotes a lever, which I term a "locking-lever," carried by a shaft 29, journaled in plates 7, and 30 a spring, the action of which is to throw said lever downward to the position shown in Fig. 10. Lever G is provided with upper and lower locking-shoulders 31 and 32, with a tailpiece 33, and with a forwardly-extending arm 34, the functions of which will presently be explained. 35 denotes a swinging arm which is pivoted at the forward end of arm 34, and 36 a spring, the action of which is to hold said arm inward to the position shown in Fig. 8. 37 is a post extending outward from outer plate 7 and carrying a set-screw 38, the function of which is to adjust and limit the movement of the swinging arm. 39 is a stump on the outer face of the break-wheel, the normal position of which is just under the lower end of swinging arm 35—that is to say, when the parts return to their normal position spring 36 will swing the arm inward just over the outer end of the stump, as clearly shown in Fig. 8. H denotes a latch which is pivoted on shaft 6, and is provided with arms 40 and 41. 42 denotes a push-rod which extends through from the front of the case between the arms of the latch, the rear end of said rod being made angular and engaging an angular opening 43 in back plate 7, so as to prevent the push-rod from turning. 46 is a spring surrounding the push-rod and bearing against the back plate 7 and against a pin or shoulder on the push-rod, its action being to hold the push-rod forward—that is, at its normal or retracted position. 47 denotes a spring, one end of which is connected to latch H, the other to a pin 48, extending outward from outer plate 7, the action of which is to draw latch H toward the right, as seen in Fig. 8, and as will be more fully explained. 49 denotes a stump on latch H, which extends forward into position to be engaged by a stump or pin 50 on the reverse side of the break-wheel, by which the latch is swung toward the left when the break-wheel returns to its normal position, as will be more fully explained. 44 denotes a notch in the right side of the push-rod, which is adapted to be engaged by arm 40 of lever H. The end of this notch toward the front end of the pin is straight sided, so that when said notch is engaged by arm 40 of latch H it will be impossible to force in push-rod 42. 45 denotes a notch on the left side of push-rod 42, which is adapted to be engaged by arm 41 on latch H. The end of this notch toward the inner end of the pin is made straight sided, so that when the push-rod is pressed in and said notch is engaged by arm 41 of latch H the push-rod will be locked at its acting position and retained there until the latch itself is moved toward the left by the engagement of stump 50 on the break-wheel with stump 49. This movement releases the push-rod, which is at once returned to its normal position by spring 46. 51 denotes an insulating-block, which is secured to the outer plate 7. 52 is a brush secured to this block and adapted to engage the teeth of the break-wheel, but so shaped as not to come in contact with the break-wheel between the teeth or with the vacant space on said wheel, which corresponds with the normal position of the parts, said position being clearly shown in Fig. 1. 53 denotes another brush, also secured to insulating-block 51, which extends outward into position to be engaged by a lug or pin 54 on push-rod 42.

Turning now to Fig. 12, in connection with Fig. 8, I will describe the electrical operation of the call-box. 55 will be assumed to be the positive or incoming binding-post and 56 the negative or outgoing binding-post. The call-box wires I designate by 57. Their relation to the main circuit A, however, I will explain later in describing the operation of the entire system. It will be seen that the current passes from the positive binding-post to the electromagnet, thence to brush 52 on block 51. This brush being insulated the circuit is normally broken at this point; but when brush 52 is in contact with one of the teeth of the break-wheel the current passes to the entire mechanism of the call-box, including, of course, push-rod 42. When this push-rod is pressed in, pin 54 engages brush 53, from whence the current passes to the negative binding-post.

I will now describe in full the operation of a call-box.

Turning now to Fig. 3, in connection with Figs. 8 to 11, inclusive, suppose the occupant of the room in which the call-box is located desires to order a carriage. By means of finger-piece 11 the operator turns pointer 10 toward the right until it registers with the word "carriage" upon the dial, it being understood, of course, that the pawl and ratchet already described prevent shaft 6, which carries the pointer, from being turned backward. This movement of the shaft and pointer carries the break-wheel to the proper position to indicate the desired call at the office when the call is noted by the clerk, this result being accomplished in a manner which I shall presently describe; but will for the present confine the description solely to the action of the occupant of the room. Having set the box to the proper call the occupant now announces a call by pressing in push-rod 42. The position of the parts after the call is set is clearly indicated in Fig. 10ᵃ. The instant the shaft is turned stump 39 on the break-wheel will lift swinging arm 35, which of course carries with it lever G. As soon as the lever is raised spring 27 will lift armature 25 away from the pole of the electromagnet and will also swing angle-arm 28 toward the left, so that the end of said angle-arm will engage locking-shoulder 32 on lever G. This will lock said lever in the raised position. As the lever is raised from the position shown in Fig. 10 to the position shown in Fig. 10ᵃ, tailpiece 33 will engage locking-hook 21 on pallet-arm 20. This will lock the pallet in the position shown in Fig. 10ᵃ and will prevent movement of scape-wheel 18, thus locking the shaft, break-wheel, gear-wheel 13, &c., at the position in which they have been placed in setting the call, it being understood, of course, that this gear-wheel is loose on the shaft, the pawl and ratchet serving merely to lock the shaft, break-wheel, &c., to gear-wheel 13, it being additionally necessary to lock the gear-wheel after the shaft has been turned and has wound the spring. This result I accomplish by locking the scape-wheel by means of tailpiece 33 and locking-hook 21. As already explained, swinging arm 35 is held in operative position by spring 36, the normal position of said arm being determined by the adjustment of set-screw 38 in post 37, said screw being so adjusted that the instant lever G has been raised to the position illustrated in Fig. 10ᵃ stump 39 will disengage itself from the swinging arm. The position of the parts, as indicated in Fig. 10ᵃ, is not changed by pressing in push-rod 42. It will be understood, however, that this movement places lug 54 on the push-rod in contact with brush 53. The instant the push-rod is pressed in spring 47 will draw latch H toward the right from the position shown in Figs. 8 and 9, so that instead of arm 40 being in engagement with notch 44, arm 41 will engage notch 45 and will lock the push-rod at its operative—i. e., its inward—position. 58 is a screw having an enlarged head which overhangs latch H, said screw lying between the arms of said latch so as to hold the latter in operative position, especially when said latch is in the reverse position from that shown in Fig. 8— i. e., when the push-rod has been pressed in to send in a call—the action of spring 46 being to force the push-rod outward. The parts remain in this position until the call is noted by the clerk at the office. When the call is noted, all of which will presently be explained in detail, an electric current passes through wires 57 of the call-box. The action of this current is to overcome the power of spring 27, which is of course made just strong enough to lift the armature, the armature instantly returning to its normal position in contact with the pole of the electromagnet, as shown in Fig. 10. The instant the armature assumes its normal position angle-arm 28 of course swings toward the right from the position shown in Fig. 10ᵃ to the position shown in Fig. 10, lever G drops, gravity being assisted by spring 30, and the armature is locked in its normal position by the engagement of angle-arm 28 with locking-shoulder 31 on said lever. The dropping of the lever, of course, lowers tailpiece 33 away from locking-hook 21 and releases the pallet. This leaves main spring 23 free to return the shaft, break-wheel, &c., to their normal position. It will be understood that before the pallet is released and the main spring begins to act to return the break-wheel, &c., to the normal position, the circuit will be closed by the engagement of brush 52 with one of the teeth of the break-wheel. The instant the main spring begins to act, however, the circuit is broken by the brush passing off said tooth, and is closed again when it engages the next tooth, and so on, each opening and closing of the circuit producing a corresponding opening and closing of a circuit at the indicator in the office, which I shall presently explain. This return of the break-wheel, shaft, pointer, &c., to their normal position constitutes the return-signal from the office. Just an instant before the break-wheel has reached its normal position on the return movement, brush 52 having engaged the last tooth, stump 50 on the break-wheel will engage stump 49 on latch H and will swing said latch toward the left against the power of spring 47. This movement disengages arm 41 from notch 45 in the push-rod and allows spring 46 to force the push-rod outward to its normal position. At the instant it reaches its normal position stump 50 on the break-wheel by engagement with stump 49 will move the latch still farther toward the left, and will place arm 40 in engagement with notch 44, as shown in Figs. 8 and 9. This locks the push-rod in position again, so that it cannot be pressed in until the break-wheel has been turned to set another call. As the break-wheel returns to its normal position stump 39 will engage the swinging arm and will press it outward against the power of the spring. When the break-wheel reaches its normal position, however, the stump will have disengaged itself from the swinging arm, and spring 36 will carry the lower end of said arm inward over the stump, so that when the break-wheel is moved again the swinging arm, lever, &c., will be raised thereby, as before. It will, of course, be apparent that when the shaft, pointer, break-wheel, &c., have been turned in setting a call it will be impossible to turn them backward. If the operator stops the pointer short of the call it is desired to send in, it is of course easy to correct the error before the push-rod has been pressed in by turning the pointer forward to the correct call. If, however, the operator, through haste or carelessness, has turned the pointer past the proper call, as indicated upon the dial, it will be impossible to set the correct call by any movement of the shaft, break-wheel, and pointer. In order to avoid trouble from this cause, however, I provide a push-rod 59, which is held in its retracted position by a spring 60. This push-rod when pressed in against the power of spring 60 engages angle-arm 28 and moves it forward toward the right, thus releasing lever G, the tail-piece, &c., permitting the pallet to oscillate and the main spring to return the break-wheel, shaft, and pointer to their normal position in precisely the same manner as if the release of the angle-arm and armature had been effected by an electric current. Suppose, for instance, that the operator had desired to call a carriage and had turned the pointer past that point on the dial, thus setting the wrong call, but that he had not announced the call by pressing in push-rod 42. The parts would now be in the position illustrated in Fig. 10$^a$. By pressing in push-rod 59 the operator would disengage angle-arm 28 from locking-shoulder 32, lever G would drop down to the position shown in Fig. 10, and the main spring would carry the shaft, break-wheel, and pointer back to their normal position, in the manner already described. The operator would then set the correct call and announce it in the manner described.

Turning now to Fig. 12, in connection with Figs. 1 to 7, inclusive, I will describe the effect of the act at the call-box upon the other elements of the system. As already stated, push-rod 42 at its inward position completes the circuit at the call-box. The passage of the current through the circuit, which as a whole I designate as A, is at this instant through wires, which I will specifically designate as follows: In order to illustrate the operation of my novel system more clearly, I have illustrated in Fig. 12, which is merely diagrammatic, two call-boxes. The call-boxes, as elements of the system, are designated B. In order to distinguish specifically, however, between the two call-boxes illustrated, I will designate the one at the left in Fig. 12 as B', and the one at the right in Fig. 12 as B$^{50}$. For convenience, let us suppose that the invention is exemplified in a fifty-room system, room 1 and room 50 being illustrated and the intermediate rooms omitted. Suppose now that the occupant of room 50 has announced a call. Tracing the current from binding-post 56 back to binding-post 55, its passage is as follows: Through wire $a$ to a point which I indicate by 61. From point 61 the current passes by a wire $g^{50}$ to an electromagnet in the annunciator, which I designate as C$^{50}$. It should be understood that in the annunciator, designated as an element of the system by C, there is an independent electromagnet for each room in the system. In the present instance two rooms only are illustrated, the electromagnet in the annunciator corresponding to room 50 being indicated by C$^{50}$, and the wire leading from wire $a$ to electromagnet C$^{50}$ being indicated by $g^{50}$. The special form of annunciator not being of the essence of my invention, I will describe briefly, in order to illustrate the full operation of my invention, an exceedingly-simple form of annunciator. $h'$ and $h^{50}$ denote pivoted drops in the annunciator, each bearing on its outer face a number (not shown in the drawings) corresponding to the number of the room with which it is connected. It will, of course, be understood by those familiar with annunciators that the face plate contains a series of openings, and that when a call is announced from any room the number of that room appears at an opening in the face plate of the annunciator. $k'$ and $k^{50}$ denote the pivoted armatures of the electromagnets corresponding to rooms 1 and 50. The outer end of each armature is provided with a hook 63, which is adapted to engage the corresponding drop and retain it at its normal position, drop $h'$ being shown at its normal position and drop $h^{50}$ at its announcing position. $j'$ and $j^{50}$ are wires leading from the electromagnets to the drops. L denotes contact-pieces, which are adapted to be engaged by the drops when in their normal position. (See drop $h'$ in engagement with the corresponding contact-piece.) $b^{50}$ and $e^{50}$, are wires which connect with the contact-piece corresponding to room 50, and $b'$ and $e'$ are wires which connect with the contact-piece corresponding to room 1. The current, having been traced to point 61, will now be traced to binding-post 55, it being understood, of course, that the circuit is open in box B' and closed in box B$^{50}$. The passage of the current from point 61 is by wire $g^{50}$ to electromagnet C$^{50}$, thence by wire $j^{50}$ to drop $h^{50}$. Prior to the closing of the circuit the parts are at what I term their "normal" position. (See drop $h'$, armature $k'$, and wire $j'$, said drop $h'$ being in engagement with the corresponding contact-piece.) The instant the circuit is closed an electric current passes over the wires and the armature is drawn from its normal position (see position in full lines) to the position in which armature $k^{50}$ is shown in dotted lines. The effect of this upward movement of the armature is to disengage hook 63 from the drop, (in the present instance drop $h^{50}$,) so that the latter is released and falls from the position in which drop $h'$ is shown to the position in which drop $h^{50}$ is shown. While the parts are at their normal position the current passes from the drop to the contact-piece, thence by wire $b^{50}$ back to binding-post 55. Drop $h'$, armature $k'$, and wire $j'$ are in position to show the circuit closed at the corresponding contact-piece. The instant, however, that the drop is released and falls to the position in which drop $h^{50}$ is shown the circuit is automatically opened by the separation of the drop and contact-piece (see position of drop $h^{50}$) and the corresponding contact-piece. 66 denotes a battery placed at any suitable place in the circuit. It will be seen that there is practically no waste of current, as the circuit is closed but an instant and the opening of the circuit is automatic. A call from any room in the system is thus announced at the office. In order to call attention to the fact that a call has been announced, I preferably employ a suitable alarm, which I designate as element F. In the present instance I have illustrated an electric bell. (See Fig. 12, also Fig. 2.) This alarm is necessarily placed in the same circuit as the annunciator, so that the alarm-magnet and drop magnets will act simultaneously. 64 (see diagrammatic view, Fig. 12, also Figs. 4 and 5) denotes an electromaget, which for convenience and protection I have shown as placed within the case of the controlling-switch. 67 denotes the pivoted armature of magnet 64, said armature being provided with a contact 68, which is adapted to close an independent local circuit. 65 denotes the wires of the local circuit and 69 the battery of the local circuit. 70 denotes an electromagnet in the local circuit and 71 a pivoted armature, which carries the clapper 72 of a bell 73, the operation of which is that of the ordinary simple form of electric bell. 74 denotes the case, and 75 the back and 76 the face plate, of the controlling-switch. The parts are secured together by means of screws 77, engaging standards 78, extending from the back. The face plate is made of hard rubber, fiber, or other insulating material, and carries a series of metallic contacts 79 corresponding in number to the rooms in the system, a wire leading from each contact and connecting with a wire leading from the corresponding room, as will presently be fully explained. The faces of these contacts are provided with depressions 79$^a$, (see Fig. 5,) the purpose of which I shall presently explain. K denotes a locking-lever pivoted to a plate 83 within the case of the controlling-switch, and provided with upper and lower locking-shoulders 80 and 81 and with double inclines 82, the purpose of which will presently be explained. 84 denotes a post extending outward from plate 83, but insulated therefrom. 85 is a spring, the action of which is to draw armature 67 away from the pole of electromagnet 64. One of the wires 65 of the local circuit is connected to contact 68, through plate 83, the other being connected to insulated post 84. When the circuit is closed by the inward movement of a push-rod 42 in a call-box, an electric current passes over the circuit, which causes armature 67 to be drawn from its normal position (shown in dotted lines in Fig. 12 and in full lines in Figs. 4 and 5) into contact with the pole of electromagnet 64, and locked in such position by lever K, which drops by gravity the instant the armature is drawn into contact with the pole of the magnet. In its normal—i. e., its retracted—position armature 67 is engaged by locking-shoulder 81. As soon, however, as the armature moves into contact with the pole of the magnet it is engaged by locking-shoulder 80 and locked in that position, in which it remains until released. As soon as locking-lever K is lifted spring 85 will draw the armature back to its normal position, as in Figs. 4 and 5. The effect of placing armature 67 in contact with the pole of the magnet is to close the local circuit by placing contact 68 in engagement with post 84. It will be seen that the local circuit remains closed, so that the bell will keep ringing until locking-lever K is lifted. The consumption of battery-power, however, by the ringing of the bell is all in the local circuit, the main circuit having been opened automatically, as already explained, an instant after it was closed. 86 denotes a shaft in the controlling-switch, which may be supported either in back 75 and face plate 76, or said shaft may be supported at the back by means of a hub 87, secured to back 75. This shaft carries within the case an arm 88, which is adapted to engage the double inclines on locking-lever K to lift the latter, thereby disengaging armature 67 and leaving spring 85 free to return said armature to its normal position, as in Figs. 4 and 5. Upon the outer end of shaft 86 is pivoted a switch-lever 89, the outer end of which is provided with an engaging-point 90, which is adapted to register with any of the depressions 79$^a$ in metallic contacts 79. These engaging-points and depressions serve to make a more perfect contact and to prevent the switch-lever from slipping off from the contacts if carelessly handled. 91 is a spring which bears against the outer face of the switch-lever and acts to press it inward, so as to retain it in engagement with either of the contacts 79, over which it may have been placed. The normal position of the switch-lever is in engagement with a pin 92, which is provided on its outer face with a similar depression 79$^a$ and is engaged by engaging-point 90 in the same manner that the contacts are. This pin is supported in face plate 76 and in a metallic bracket 93, which is itself secured to the face plate. 94 denotes a plate on the inner side of face plate 76, through which pin 92 passes loosely—that is, not in contact therewith—so that no current will pass. 95 is a cross-pin in pin 92, and 96 a spring which bears against cross-pin 95 and against bracket 93 and acts to force the pin outward as soon as the switch-lever is lifted. It should be understood that spring 91 is much stronger than spring 96, so that normally pin 92 is held inward in the position shown in the drawings. (See, especially, Fig. 5$^a$.) As soon, however, as the switch-lever is lifted spring 96 will act to force the pin outward and will place cross-pin 95 in contact with plate 94. This will permit a current to pass from the cross-pin to plate 94, thus closing a circuit at this point, which, however, is an entirely different circuit from the one already described and may be termed a "second circuit." The course of the circuit already described, and which I may term for convenience the "first circuit," is indicated in Fig. 12 by full arrows and the course of the second circuit by dotted arrows. $c$ denotes wires which connect with wire $a$ in such a manner as, under certain circumstances, to cut out or short circuit electromagnet 64. The arrangement of wires $c$ will be clearly understood from Fig. 5$^a$, in connection with Fig. 12. One of the wires connects with plate 94, the other with bracket 93. It will be seen, therefore, that when switch-lever 89 is lifted and spring 96 has placed cross-pin 95 in engagement with plate 94 the circuit is closed at that point. The circuit is still open, however, at another point, which is not closed until the switch-lever is placed in engagement with one of the contacts 79. This completes the second circuit, electromagnet 64 being cut out or short circuited by means of wires $c$, as will be more fully explained. The passage of the current in the second circuit is as follows: From binding post 56 by wire $a$ to wire $c$, thence through bracket 93 and pin 92 to plate 94, and back through wires $c$ and $a$ to point 61. From this point the current passes by wire $d$ to shaft 86. It will be understood that it will be impossible for the current to pass through electromagnet C' and release the drop for the reason that the circuit is open in room 1, and that it cannot pass through electromagnet C$^{50}$ for the reason that the circuit is open at that point, drop $h^{50}$ being down and not in engagement with a contact-piece L. It will furthermore be understood from Fig. 4 that it is impossible for the current to be short circuited within the case of the controlling-switch for the reason that one end of said shaft is insulated by means of back 75, the other end being insulated by means of face plate 76, and that in order to place switch-lever 89 in engagement with any of the contacts 79 the shaft will have to be rotated far enough, so that arm 88 will have passed the double incline 82 on locking-lever K. From shaft 86 the current passes by means of switch-lever 89 to the special contact 79, which corresponds to the room in the system from which the call is announced, in the present instance room 50. From the contact 79 the current passes by means of wire $e^{50}$ to wire $b^{50}$ to binding-post 55, thence through call-box wires 57 and electromagnet 24 to binding-post 56, thus completing what I term the "second circuit."

I now come to the fourth essential element of my novel system—i. e., an indicator—which I term "element D." This element is necessarily placed in the same circuit with the controlling-switch, (designated by E,) and which for convenience I have described first. Any special form of indicator mechanism is not essential to the operativeness of the system, although I preferably use the indicator mechanism illustrated in Figs. 6 and 7, which is of my own invention. The essential requirement is a mechanism operating with a step-by-step movement, which is connected with and operates in unison with the mechanism of the call-box. 97 denotes the electromagnet of the indicator, and 98 the armature of said magnet, which is pivoted between the plates 99, which carry the indicator mechanism, as at 100. Plates 99 are secured together and retained in operative position by standards 101, in the usual manner. 102 is a shaft journaled in plates 99 and carrying a ratchet-wheel 103 and a drum 104. 105 denotes a cord secured to the drum and adapted to be wound thereon, and 106 a weight attached to the cord. At the outer end of shaft 102 is a pointer 107. (See Figs. 7 and 1.) Shaft 102 also has extending outward therefrom a pin 108, which is adapted to engage a pin 109, extending outward from the front plate 99 to stop the movement of the shaft and parts carried thereby at the instant that pointer 107 registers with the normal point indicated in the present instance by a star on the dial 110 of the indicator, this dial corresponding exactly with the dial 4 of the call-box. (See Figs. 1 and 3.) 111 is a hooked pawl connected to the rear end of armature 98 and adapted to engage the teeth of ratchet-wheel 103. This pawl is provided with an incline 112, the purpose of which will presently be explained. 113 is a pawl pivoted on a cross-rod between plates 99, and acting to prevent ratchet-wheel 103 from turning backward. The operation of the indicator will be clearly understood from Fig. 6. The instant the circuit is closed and the current passes through the windings of electromagnet 97, armature 98 is drawn down into contact with the pole of the electromagnet, the effect of which is to draw up hooked pawl 111, which carries the ratchet-wheel forward one tooth, in which position it is locked by pawl 113, each forward movement of the ratchet-wheel of course acting to wind the cord upon the drum. The armature is held at its raised—i. e., its retracted—position by a spring 114. 115 is a set-screw in one of the standards 101 for adjusting the upward movement of the armature. It will be seen that each time the circuit is closed armature 98 will be drawn down into contact with the pole of the electromagnet, and that the instant the circuit is opened spring 114 will return the armature to the position in which it is shown in Fig. 6, hooked pawl 111 slipping down over a tooth of the ratchet. It will be noted that each call made by my novel system necessitates the use of three electromagnets, and if an alarm is used four electromagnets, not including, of course, the electromagnet in the local circuit. The electromagnets essential to the operativeness of the system are an electromagnet in a call-box, an electromagnet in the annunciator, and an electromagnet in the indicator. To these I preferably add an electromagnet in the alarm.

It is a well-understood principle that when a "low-resistance" electromagnet—i. e., one having relatively few turns of wire—and a "high-resistance" electromagnet—i. e., one having relatively many turns of wire—are placed in series in a circuit the high-resistance magnet will act strongly upon its armature, while the low-resistance magnet will act quite weakly or not at all. Upon this principle depends the operativeness of my novel system, in which it is required that the electromagnets in the annunciator and the alarm work together. I therefore make them of practically the same resistance, and in order that the electromagnet in a call-box will not work while in the same circuit with them— i. e., in the first circuit—I make the electromagnets in the annunciator and the alarm of relatively high resistance and the electromagnets in the call-boxes of relatively low resistance, and as the electromagnet in the indicator is required to work with the electromagnet in a call-box as in the second circuit I make the electromagnet in the indicator of relatively low resistance.

I will now describe the operation of my entire system. The operator in the room announces a call at the office in the manner already described at length. Suppose, for instance, that the occupant of room 50 desires to call a carriage. The operator will by means of finger-piece 11 turn pointer 10 until it registers with the word "carriage" upon dial 4 of the call-box. He then presses in push-rod 42, thereby closing the first circuit and announcing a call at the office. The instant the circuit is closed the effect at the office is to release the annunciator-drop corresponding to the room from which the call is announced and simultaneously to close the local circuit, thereby putting the alarm in operation. This ends the duty of the first circuit, which is instantly opened automatically, as shown at the lower left-hand corner in Fig. 12, by the falling of drop $h^{50}$ out of engagement with the corresponding contact-piece. There is now no waste of battery-power in the circuit, which is open. The clerk now proceeds to ascertain the special call made from room 50 and also to inform the occupant of said room that the call is noted. These results he produces by manipulation of switch-lever 89, said lever being provided with a finger-piece 116 for convenience in operation. The clerk first lifts the switch-lever away from spring-actuated pin 92, thereby connecting the short-circuit wires $c$, in the manner already described, and then by turning shaft 86, to which the switch-lever is pivoted, places engaging point 90 upon the switch-lever over the depression $79^a$ in the metallic contact 79, corresponding to the room from which the call was sent. The shape of the contact-point and the depression, with the assistance of spring 91, retains the switch-lever in engagement with the contact, so that there is little danger of the switch-lever slipping, and the switch-lever is retained in position should the operator remove his hand therefrom. The effect of the engagement of the switch-lever with the contact-point corresponding to the room from which the call was announced is to close the second circuit, which includes the electromagnets in the call-box from which the call was sent and in the indicator. It will, of course, be apparent that the call-box is comprised in the first circuit—that is, that the current passes over wires 57 in the call-box and also through the windings of electromagnet 24 to complete the circuit; but as the electromagnet in the call-box is of relatively low resistance and the electromagnets in the alarm and the annunciator are of relatively high resistance the call-box electromagnet will not operate in this circuit. In the second circuit, however, which comprises a low-resistance call-box electromagnet and the low-resistance indicator electromagnet, no high-resistance electromagnets are included, as will be more fully explained. Another effect of the rotary movement of shaft 86 is to lift lever K from the position shown in Fig. 12 by engagement of arm 88 with one of the inclines 82. The effect of this movement will be clearly understood from Fig. 4. It will be apparent that before shaft 86 can have turned far enough in either direction to place switch-lever 89 over one of the contact-points arm 88 will have engaged one of the double inclines 82 and have lifted lever K high enough to disengage locking-shoulder 80 from armature 67. The instant the armature is disengaged spring 85 acts to draw it to its retracted position, as shown in Fig. 4—that is, in engagement with locking-shoulder 81—in which position the parts must remain until the first circuit is again closed, which can only be by the announcing of another call from a room in the system. It will be understood from Fig. 4, in connection with Fig. 12, in which the retracted position of the armature is shown in dotted lines, that even before the second circuit is closed the local circuit will be opened and the alarm be stopped.

Turning now to the call box, (see Figs. 8 to 11, inclusive,) the effect of closing the second circuit and sending a current through the call-box is to return armature 25 to its normal position in contact with the pole of electromagnet 24, in which position it is locked, all of which has been fully explained. This leaves main spring 23 free to return shaft 6, the break-wheel, and pointer 10 to their normal position. Each time brush 52 passes off a tooth of the break-wheel the circuit is opened, and when it engages the next tooth the circuit is closed again, and so on, the engagement of each tooth of the break-wheel acting to close and open the circuit.

Turning now to the indicator, (see Figs. 6 and 7, in connection with Figs. 1 and 3,) the action of indicator-pointer 107 is just the reverse of the action of call-box pointer 10—that is to say, the first step of the indicator-pointer in indicating the special call that has been announced corresponds to the first step of the call-box pointer in returning to its normal position. It has been assumed for the purpose of description that the occupant of room 50 has called a carriage, that being the eleventh call indicated on the call-box and indicating-dials. Before the controlling-switch has been manipulated pointer 10 will stand at the eleventh call, and pointer 107 will stand at its normal position. As soon as the connection between the room and the office has been established by placing the controlling-lever in engagement with the contact 79 corresponding to room 50, the break-wheel is released and, with shaft 6 and pointer 10, commences to return to its normal position. The first closing of the circuit will cause pointer 107 to register with the first call and pointer 10 to register with the tenth call. The second closing of the circuit will cause pointer 107 to register with the second call and pointer 10 to register with the ninth call, and so on, the eleventh closing of the circuit causing pointer 107 to register with the eleventh call and pointer 10 to assume its normal position. The mechanical operation of the indicator will be clearly understood from Fig. 6. The first closing of the circuit sends a current through the windings of electromagnet 97. This draws armature 98 into contact with the pole of said magnet, and by lifting hooked pawl 111 moves ratchet-wheel 103 one tooth, carrying shaft 102 and pointer 107 along with it and winding cord 105 upon drum 104. At the completion of the operation just described pointer 10 in the call-box will have returned to its normal position. This informs the occupant of the room that the call has been noted. It is, in other words, a return-signal. Indicator-pointer 107 will now register with the eleventh call, in the present instance "carriage." The annunciator had informed the clerk that the call was from room 50, and the indicator now tells him that the occupant of room 50 wants a carriage. It then simply remains to return the indicator-pointer to its normal position. As has already been stated, each forward movement of shaft 102, the ratchet-wheel, drum, &c., will act to wind cord 105 upon the drum and lift the weight. To return the parts, therefore, to their normal position, it is simply necessary to release the ratchet-wheel. This leaves the weight free to act, the pointer being stopped at the required point by the engagement of pin 108 with pin 109. This release of the ratchet is accomplished by means of pins 117 and 118 on a lever 119, which is pivoted on a cross-rod between plates 99, pin 117 being adapted to engage pawl 113 and lift it entirely out of engagement with the ratchet, and pin 118 being adapted to engage incline 112 on hooked pawl 111, lifting said pawl backward out of engagement with the ratchet. Lever 119 is lifted by means of a rod 120, which is pivoted to said rod and to an arm 121, extending outward from a shaft 122, the forward end of which is shown as extending through the face plate 76 of the controlling-switch, and which is provided with a finger-piece 123 for convenience in operation. It will of course be apparent that it is a matter of no consequence how many calls may be announced at a time or closely following each other. It has already been explained that the first circuit is opened automatically an instant after it is closed. Should calls be sent in from a number of rooms simultaneously or closely following each other, the drop corresponding to each room would fall and the alarm would commence to ring through the closing of the local circuit. The clerk at the office can of course receive but one call at a time, it being necessary for the indicator-pointer to be returned to its normal position and the switch-lever to be placed on another contact 79 before a second call can be received. In receiving a number of calls, one after the other, it is not necessary to return switch-lever 89 to its normal position—*i. e.*, in engagement with spring-actuated pin 92. After a call has been received the clerk returns the indicator-pointer to its normal position by movement of finger-piece 123 and removes switch-lever 89 from the special contact 79, with which it has been engaged, and places it on another contact 79, corresponding to another room from which a call has been announced by the fall of an annunciator-drop, these operations being repeated until every call announced at the annunciator has been received. The annunciator-drops are then returned to their normal position in any suitable and convenient manner. In the present instance I have shown the drops as adapted to be returned by the upward movement of a frame 124. This frame is provided with a finger-piece 125, extending through the side of the annunciator-case for convenience in operation. An upward movement of the frame carries all the drops with it and causes them to be engaged by the hooks 63 of the annunciator-armatures, the frame then dropping back to its normal position by gravity. It should be noted that while every room in the system may be, and preferably is, provided with a call-box it is not necessary to the operativeness of the system that every room should have a call-box. If preferred, for example, in applying my novel system to an annunciator already in use, a part only of the rooms may be provided with call-boxes, the ordinary push-buttons being allowed to remain in the other rooms. Where a push-button is used, its effect would be precisely the same as the inward movement of push-rod 42, which would close the first circuit, set the alarm in operation, and release the annunciator-drop corresponding to the room from which the call was sent. Owing, however, to the use of my novel contact-pieces L in the annunciator, there can be no waste of current whether the drop be operated by a call-box or push-button, for the reason that the instant the drop falls the circuit is opened and loss of battery-power must cease.

To apply my novel indicating system in connection with an annunciator already in use, it is simply necessary to rewind the annunciator-magnets to a high resistance and change the electrical connections, as shown in Fig. 12, so as to place a contact-piece L in the circuit at each drop.

The arrangement of the indicator and controlling-switch relative to the annunciator is of course not of the essence of my invention. Where my novel system is applied to an annunciator already in use, the indicator and the controlling-switch may be placed wherever is most convenient. In the present instance (see Figs. 1 and 2) I have illustrated the indicator as placed above the annunciator and the controlling-switch as placed below it, all three elements being attached to or inclosed within a single frame.

I wish it distinctly understood that the details of construction can be varied to an almost unlimited extent without departing from the principle of my invention.

I claim—

1. In combination an electrical circuit, a call box having a low resistance electro magnet, an annunciator having a high resistance electro magnet, an indicator having a low resistance electro magnet and adapted to operate with the call box to indicate the special call sent and a controlling switch by which connection may be established between the call box and the indicator.

2. In combination an electrical circuit, a call box having a low resistance electro magnet, an annunciator having a high resistance electro magnet, an indicator having a low resistance electro magnet and adapted to operate in connection with the call box to indicate the special call sent, a controlling switch by which connection may be established between the call box and the indicator and an alarm having a high resistance electro magnet and operating in connection with the annunciator.

3. In combination an electrical circuit, calling apparatus having a low resistance electro magnet, an annunciator having a high resistance electro magnet, an indicator having a low resistance electro magnet and adapted to operate in connection with the calling apparatus to indicate the special call sent, a controlling switch by which connection may be established between the call box and the indicator, an alarm having a high resistance electro magnet and a local circuit for the alarm which is closed by the closing of the main circuit.

4. In combination an electrical circuit, a call box having a low resistance electro magnet, an indicator having a low resistance electro magnet adapted to operate in connection with the call box electro magnet to indicate the special call sent and to give a return signal, an annunciator having a high resistance electro magnet, suitable means for automatically opening the circuit the instant the annunciator acts, and a controlling switch whereby a second circuit may be established comprising the call box and the indicator.

5. In combination an electrical circuit, a call box having a low resistance electro magnet, an indicator having a low resistance electro magnet adapted to operate in connection with the call box electro magnet, an annunciator having a high resistance electro magnet, suitable means for automatically opening the circuit the instant the annunciator acts, an alarm, a local circuit for operating the alarm, a high resistance electro magnet 64 in the main circuit for controlling the alarm, said local circuit being closed by the closing of the main circuit, suitable means for retaining the local circuit closed so that the alarm will sound after the main circuit is opened and a controlling switch by which a second circuit may be established after the opening of the first circuit, said first circuit comprising the high resistance electro magnets so that the alarm will sound and the annunciator announce the call after which the circuit will be automatically opened, and said second circuit comprising the low resistance electro magnets in the call box and the indicator so that when the controlling switch has been operated the special call sent in will be indicated and a return signal given.

6. In a system of the character described the combination with an electrical circuit, of a call box having a low resistance electro magnet, an annunciator having a high resistance electro magnet, suitable means for automatically opening the circuit the instant the annunciator acts, and a controlling switch for establishing a second circuit so that the call box mechanism will act after the first circuit has been opened and the controlling switch has been operated.

7. In a system of the character described the combination with an electrical circuit, of a call box having a low resistance electro magnet by which the mechanism is released, an indicator having a low resistance electro magnet, an annunciator having a high resistance electro magnet, suitable means for automatically opening the circuit the instant the annunciator has acted, and a controlling switch for establishing a second circuit after the first circuit has been opened by the action of the annunciator.

8. In a system of the character described the combination with an electrical circuit, a call box having a low resistance electro magnet and an indicator having a low resistance electro magnet, of a high resistance electro magnet, means for automatically opening the circuit the instant said electro magnet has acted, and a controlling switch whereby a second circuit may be established comprising the two low resistance electro magnets.

9. The combination with an electrical circuit and an annunciator having a drop of ordinary construction, and a high resistance electro magnet, a call box having a low resistance electro magnet, an indicator having a low resistance electro magnet and a controlling switch of a contact piece L which is engaged by the drop when the latter is at its normal position whereby the circuit is kept closed, said drop when released by the announcing of a call moving away from said contact whereby the circuit is automatically opened.

10. In a system of the character described the combination with a call box having a low resistance electro magnet, an indicator having a low resistance electro magnet and an annunciator having a high resistance electro magnet, a drop, and an armature whereby the drop is held at its normal position, of a contact piece L which forms a portion of the circuit and is engaged by the drop when the latter is at its normal position so that when said drop is released by the announcing of a call the circuit is opened by the disengagement of the drop and the contact piece.

11. In combination an electrical circuit, a call box having a low resistance electro magnet, an indicator having a low resistance electro magnet and an annunciator having a high resistance electro magnet, a drop, an armature adapted to engage and to retain the drop at its normal position when said armature is in its retracted position, and a contact piece L forming part of the circuit which is engaged by the drop when the latter is at its normal position thereby keeping the circuit closed, said armature when drawn to the pole of the electro magnet releasing the drop and thereby opening the circuit.

12. In combination an electrical circuit, a call box, having a low resistance electro magnet, an indicator having a low resistance electro magnet, an annunciator having a drop, and high resistance electro magnet whose armature acts to hold the drop at its normal position, and a contact piece L which is engaged by the drop when at its normal position.

13. In combination an electrical circuit, a plurality of call boxes each having a low resistance electro magnet, an indicator having a low resistance electro magnet an annunciator having drops corresponding to the call boxes, high resistance electro magnets whose armatures act to hold the drops at their normal position, and contact pieces L which are engaged by the drops at their normal position, a controlling switch having contacts 79 corresponding to the call boxes and the drops, shaft 86 and switch lever 89 adapted to engage either of said contacts.

14. In a system of the character described the combination with a call box having a low resistance electro magnet, an indicator having a low resistance electro magnet, an annunciator having a high resistance electro magnet, and an alarm also having a high resistance electro magnet, of wires "$a$" and $g^{50}$ leading from the call box to the annunciator, wire $j^{50}$ leading from the magnet to an annunciator drop, a contact piece L adapted to engage the drop, wire $b^{50}$ leading from the contact piece to the call box, wire $e^{50}$ leading from the contact piece to a controlling switch, wire "$d$" leading from wire "$a$" to the controlling switch, and wires "$c$" which lead from the controlling switch to wire "$a$" on opposite sides of the alarm electro magnet whereby an electric current is caused to operate the annunciator and to open the circuit after which a second circuit may be established by the controlling switch which will short-circuit the alarm electro magnet.

15. The combination with an electrical circuit having an electro magnet 64 provided with an armature 67 having a contact 68, of a local circuit 65 which is adapted to be opened or closed by said contact piece, lever K having double inclines 82 and a shoulder 80 adapted to engage the armature whereby the contact is locked in position to keep the local circuit closed, a spring 85 acting to draw the armature back to its normal position, and an arm 88 adapted to engage the inclines to lift lever K and open the local circuit.

16. The combination with wires "$a$," $b^{50}$, "$d$," $e^{50}$ and "$c$" of insulated face plate 76 having a plurality of contacts 79 with one of which wire $e^{50}$ is connected, shaft 86 with which wire "$d$" is connected, an indicator also connected to wire "$d$" and having a low resistance electro magnet, a call box also having a low resistance electro magnet, an annunciator having a high resistance electro magnet, an alarm also having a high resistance electro magnet, and a lever 89 pivoted to shaft 86 and adapted to engage either of the contacts whereby a second circuit is established comprising the two low resistance electro magnets and leaving out the two high resistance electro magnets, substantially as described.

17. In combination a first electrical circuit comprising a call box having a low resistance electro magnet, an indicator having a low resistance electromagnet, an alarm having a high resistance electro magnet, an annunciator having a high resistance electro magnet, and a contact L and a second electrical circuit comprising wires "$a$," $b^{50}$, "$d$," $e^{50}$ and "$c$" whereby when the first circuit is closed by operating the call box the two high resistance electro magnets operate the alarm and the annunciator and the circuit is automatically opened, an insulated face plate 76 having a plurality of contacts 79 with one of which wire $e^{50}$ is connected, a shaft 86 with which wire "$d$" is connected and a lever 89 pivoted to said shaft and adapted to engage either of said contacts whereby a second circuit is established comprising the call box and the indicator, substantially as described and for the purpose set forth.

18. The combination with an electrical circuit having an electro magnet 64 provided with an armature 67 having a contact 68, of a local circuit 65 adapted to be opened or closed by said contact, lever K having double inclines 82, and a shoulder 80 adapted to engage the armature whereby the contact is locked in position to keep the local circuit closed, a spring 85 acting to draw the lever back to its normal position, insulated face plate 76 having a plurality of contacts 79, a shaft 86 having an arm 88 adapted to engage said inclines to lift lever K and open the local circuit, a pivoted lever 89 adapted to engage either of said contacts to establish a second circuit.

19. In combination an electrical circuit, a call box having a low resistance electro magnet, an indicator having a low resistance electro magnet, a high resistance electro magnet 64 provided with an armature 67 having a contact 68, a local circuit 65 adapted to be opened or closed by said contact, a high resistance electro magnet $C^{50}$ having an armature $k^{50}$ provided with a hook which holds a drop $h^{50}$ in the raised position, contact piece L, lever K having a shoulder 80 adapted to engage armature 67 to keep the local circuit closed, insulated face plate 76 having a plurality of contacts 79 a shaft 86 having an arm adapted to engage lever K to open the local circuit, and a pivoted lever 89 adapted to engage either of said contacts whereby when the circuit is closed at the call box the two high resistance electro magnets operate as set forth and the circuit is automatically opened, and when lever 89 is operated a second circuit is established comprising the low resistance electro magnets of the call box and indicator.

20. The combination with wires "$c$," $e^{50}$ and "$d$" of insulated face plate 76 having a plurality of contacts 79 with one of which wire $e^{50}$ is connected, shaft 86 with which wire "$d$" is connected, lever 89 pivoted to said shaft and adapted to engage either of said contacts, bracket 93 and plate 94 with which wires "$c$" are connected, pin 92 engaging bracket 93 and having a cross pin adapted to engage plate 94, a spring 96 acting to hold the cross pin and plate in engagement, said pin corresponding to said contact points and being engaged by lever 89, and a spring 91 bearing against said lever and acting to force said pin inward against the power of spring 96 and retain the cross pin out of engagement with the plate until the lever is removed from said pin.

21. In combination a first electrical circuit, a second electrical circuit, a call box having a low resistance electro magnet, an annunciator having a high resistance electro magnet, an indicator having a low resistance electro magnet adapted to operate in connection with the call box, a controlling switch having contacts 79 corresponding to the different rooms in the system, and switch lever 89 adapted to be placed in engagement with either of said contacts whereby the second circuit comprising the call box, indicator and controlling switch may be established after the first circuit has been opened by the operation of the annunciator.

22. In combination an electrical circuit, a series of call boxes, each having a low resistance electro magnet, an indicator having a low resistance electro magnet, an annunciator having a high resistance electro magnet, and a controlling switch having a series of contacts corresponding to the several call boxes, and a switch lever pivoted to swing in an arc of a circle to engage either of said contacts whereby a circuit is established comprising the indicator and any special call box in the system.

23. The combination with an electrical circuit, a suitable annunciator, an annunciator having a high resistance electro magnet, an indicator having a low resistance electro magnet and a controlling switch, of a call box having a low resistance electro magnet and provided with a break wheel having teeth corresponding in number to the number of possible calls and one vacant space, a brush 52 adapted to engage the teeth only of the break wheel whereby the circuit is closed each time the brush comes in contact with a tooth and opened again when the tooth passes out of contact with the brush.

24. The combination with an electrical circuit, a break wheel and a suitable train adapted to return the break wheel to its normal position, of a pallet comprised in said train and provided with a locking hook, a locking lever G adapted to engage said hook when the train is set, an electro magnet whose armature is provided with an angle arm 28 adapted to hold the locking lever in locking position, a spring acting to draw the armature into locking position, and suitable means for moving the angle arm and causing the locking lever to release the locking hook so that the train can return the break wheel to its normal position.

25. In combination with an electrical circuit, a break wheel, and a suitable train adapted to return the break wheel to its normal position, of a pallet comprised in said train and provided with a locking hook, a locking lever G adapted to engage said hook, when the train is set, an electro magnet whose armature is provided with an angle arm 28 adapted to hold the locking lever in locking position, a spring acting to place the angle arm in locking position, brush 52 adapted to engage the break wheel, a brush 53 and a push pin adapted to engage brush 53 to close the circuit.

26. The combination with an electrical circuit, a break wheel and a suitable train adapted to return the break wheel to its normal position, of a pallet comprised in said train and provided with a locking hook, a locking lever G adapted to engage said hook, an electro magnet whose armature is provided with an angle arm to hold the locking lever in locking position, a spring acting to place the angle arm in the locking position, brush 52 adapted to engage the break wheel, brush 53 a push pin adapted to engage said brush, and a latch H adapted to lock the push pin at either of its positions.

27. The combination with an electrical circuit, a break wheel and a suitable train adapted to return the break wheel to its normal position, of a pallet comprised in said train and provided with a locking hook, a locking lever G adapted to engage said hook, an electro magnet whose armature is provided with an angle arm adapted to hold the locking lever in locking position, a spring acting to place the angle arm in locking position, brush 52 adapted to engage the break wheel, brush 53, a push pin adapted to engage said brush and provided with locking notches, and a latch H having arms adapted to engage the notches in the push pin to lock said pin in either of its positions.

28. The combination with an electrical circuit, a break wheel having a pin 50 and a suitable train adapted to return the break wheel to its normal position, of a pallet comprised in said train and provided with a locking hook, a locking lever G adapted to engage said hook, an electro magnet whose armature is provided with an angle arm adapted to hold the locking lever in locking position, a spring adapted to place the angle arm in locking position, brush 52 adapted to engage the break wheel, brush 53, a push pin adapted to engage said brush and provided with locking notches, a spring 46 adapted to hold the push pin at its retracted position, a latch H having arms adapted to engage the notches in the push pin, spring 47 adapted to draw the latch into position to lock the push pin at its inward position, said pin 50 acting as the break wheel returns to its normal position to disengage the latch from the push pin and allow spring 46 to return the push pin to its retracted position in which it is locked by the engagement of the other arm of the latch with the other locking notch.

29. The combination with an electrical circuit, a break wheel having a stump 39, and a suitable train adapted to return the break wheel to its normal position, of a pallet comprised in said train and provided with a locking hook, a locking lever G adapted to engage said hook and having an arm 34 carrying a swinging arm 35 which is engaged by said stump when the break wheel begins to move to raise the locking lever into locking position, an electro magnet whose armature is provided with an angle arm, a spring acting to draw the armature away from the magnet and to place the angle arm in position to retain the locking lever in locking position, brush 52 adapted to engage the break wheel, brush 53, and push pin 42 adapted to engage brush 53.

30. The combination with an electrical circuit and a suitable call box, of an indicator consisting of a shaft carrying a ratchet, pointer and drum, a cord adapted to be wound on the drum and carrying a weight, an electro magnet, a pivoted armature carrying at its rear end a hooked pawl adapted to engage the ratchet, said pawl being provided with an incline 112, a spring acting to hold the armature out of engagement with the electro magnet, a pawl 113 adapted to lock the ratchet against backward movement, and a lever 119 carrying pins adapted to engage incline 112 and pawl 113 whereby the shaft, pointer and ratchet will be given a movement forward each time the armature is drawn to the pole of the electro magnet, and means for raising lever 119 so that both pawls are disengaged from the ratchet leaving the cord and weight free to return the parts to their normal position.

In testimony whereof I affix my signature in presence of two witnesses.

WALTER F. BANKS.

Witnesses:
W. H. COUPE,
ALEXR. DONEGAN.